United States Patent
Nakatani et al.

(10) Patent No.: US 6,326,035 B1
(45) Date of Patent: Dec. 4, 2001

(54) METHOD FOR THE SEPARATION OF RAPESEED GERM AND RAPESEED GERM OIL

(75) Inventors: Akihiro Nakatani, Yokohama; Yoichi Ozawa, Kawasaki; Toru Nakamura, Yokohama; Yasushi Morinaga, Kawasaki; Masayoshi Naruse, Yokohama, all of (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 09/562,926

(22) Filed: May 2, 2000

(30) Foreign Application Priority Data

May 11, 1999 (JP) .................................................. 11-129486

(51) Int. Cl.$^7$ .............................. A01N 65/00; A23D 7/00
(52) U.S. Cl. ............................................. 424/755; 426/601
(58) Field of Search ............................ 426/601; 424/725, 424/755

(56) References Cited

U.S. PATENT DOCUMENTS 3,821,451   6/1974   Palyi .
4,477,386   10/1984  Fujita .

OTHER PUBLICATIONS

Nehlin et al., "Fatty acid composition in microspore–derived secondary embryos of *Brassica napus L* .", Plant Science 120 : 205–13 (1996).*

H. Aach, et al., Journal of Plant Physiology, vol. 151, pp. 323–328, "Distribution of Lipid Radioactivity after Fractionation of $^{14}$C–Labelled Zygotic Rape Embryos", 1997.

* cited by examiner

*Primary Examiner*—Sandra Saucier
(74) *Attorney, Agent, or Firm*—Oblon, Spivak, McClelland, Maier & Neustadt, P.C.

(57) ABSTRACT

The purpose of the present invention is to efficiently separate and utilize the rapeseed germ.

The present invention relates to a method for the production of a fraction containing a rapeseed germ as a main component, comprising crushing a rapeseed and separating said fraction. One of the specific products derived from rapeseed germ is the oil and fat prepared by extraction or expression of the rapeseed germ.

9 Claims, No Drawings

METHOD FOR THE SEPARATION OF RAPESEED GERM AND RAPESEED GERM OIL

TECHNICAL FIELD

The invention relates to a method for the production of rapeseed germ, to oil and fat, and protein composition prepared from the rapeseed germ thus produced.

BACKGROUND ART

A huge amount of rapeseeds that are used as oil seeds is mainly imported from abroad.

A rapeseed contains approximately 40–45 wt % of oil, which is the highest ratio among those of oil seeds including soybean, sesame and the like. For that reason, mechanical expression of the rapeseed can be easily carried out, and the rapeseed is a very useful material for vegetable food oil and fat.

A rapeseed oil is usually produced by first flaking the rapeseed, then subjecting the flaked rapeseed to a heat treatment, and finally expressing it by means of an expressing machine named an "expeller" so as to obtain about ½–¾ of the total oil contained in the rapeseed. The oil remaining in an expression cake, i.e., the cake obtained in the expression process, is then extracted with n-hexane.

The oil that is obtained by the expression process (referred to as "expression oil" hereinafter) and the oil that is obtained by the extraction process (referred to as "extraction oil" hereinafter) are combined and purified to give the rapeseed oil.

On the other hand, after being separated from the solvent, an extraction cake that is obtained in the extraction process is utilized mainly as fertilizer or feed. However, as these by-products other than oil is sold at a very low price, it has been desired to more effectively utilize the above by-products.

For example, it has been tried to increase a protein content by removing a hull from the rapeseed, or to increase a value of the extraction cake as feed by removing bitterness components such as tannin from it with water or an organic solvent.

Like the other oil seeds, the rapeseed consists of a cotyledon, a hull and a germ. The germs of the oil seeds other than the rapeseed, such as those of soybean, wheat, rice, corn and the like have already been actually utilized.

On the other hand, since the germ of a relatively small oil seed such as the rapeseed (ca. 1.9 mm in diameter) is very small (ca. 1.5 mm in length and ca. 0.5 mm in diameter), when compared with that of corn (ca.8 mm in length, ca.3 mm in width, and ca.2 mm in thickness), an attention has been hardly made to the rapeseed germ and no try has been made to separate and utilize a fraction of the rapeseed that has a high germ content.

The investigation of the present inventors has revealed that the ratio of the germ content in the rapeseed is approximately 12 wt %, which is much higher than that of soybean (ca.2–3 wt %).

It is therefore expected that an efficient separation and recovery of the rapeseed germ in an industrial scale could expand its utility.

For the purpose of efficiently separating and utilizing the rapeseed germ, the present inventors have studied and found that not only the hull but also the germ can be peeled off from the cotyledon during the crushing process of the gains of the rapeseed under compact stress so as to efficiently separate a fraction containing its germ as a main component. It is also revealed that the thus separated fraction has such a higher germ content as about 95 wt % at maximum than that of the soybean (75 wt % at maximum).

DISCLOSURE OF THE INVENTION

The present invention relates to a method for the production of a fraction containing a rapeseed germ as a main component, comprising crushing a rapeseed and separating said fraction.

The present invention further relates to oil and fat, defatted cake, and protein composition that are prepared from a material containing the rapeseed germ as a main component. Said fraction prepared according to the present invention may be used as the above material.

BEST MODE FOR CARRYING OUT THE INVENTION

The present invention will be further described in more detail.

Before being subjected to the present method, grains of the rapeseed may be treated by means of washing with water, sieving-out, magnetism, suspension selection, and the like in order to optionally remove foreign substances such as grains of sand, metals, and small stones. Any variety of the rapeseed species may be used in the present invention.

The rapeseed may be crushed by any method known in the art without any limitation with respect to its principle or mechanism, making use of, for example, compressive stress, impact stress, shearing stress, and friction. For instance, an impact stress-type crusher may be used in the present invention in which a centrifugal force is applied to materials to be crushed by a disc rotting at a high speed, so that said materials will collide with baffles or pins provided in the crusher or on the wall of it. Alternatively, a pin mill-type crusher may be used in the present invention.

The impact stress-type crusher includes an entrainment-type, a hammer mill-type, a roller mill-type, etc., and any type of which may be used in the present invention.

The "crushing" means in this specification to break larger gains into smaller ones, including crude crushing, medium crushing, fine crushing and the like, depending on the size of the thus crushed grains. The degree of crushing may be optionally controlled by those skilled in the art. It is desirable in terms of yield that the germ is effectively peeled off from the cotyledon while substantially keeping its original size in the crushing process.

Prior to the crushing, the rapeseeds may be subjected to a heat or drying treatment.

The separation process may be carried out by any means known in the art without any limitation with respect to its principle or mechanism. For example, the separation may be done by making use of difference in the specific gravity such as sorting with air or under flow, or by using a sieve. The conditions in the separation process may be optionally determined by those skilled in the art depending on the means adopted in this process.

The separation process may be efficiently performed by removing the hulls and fine fractionicles with a vibrating fluidized bed, a light-fraction sucking apparatus and the like prior the separation process of the crushed rapeseeds.

The fraction separated according to the present invention, which may be also named a "germ fraction", contains as a main component the rapeseed germ of at least 38 wt %, preferably 75 wt % or more, more preferably 95 wt % or more.

The germ fraction may be obtained by separating the crushed rapeseed into a fraction of 16 mesh or less (1 mm or less), 20 mesh (850 $\mu$m or less), or 24–32 mesh (710 $\mu$m–500$\mu$m) with a sieve, for example.

The oil and fat, defatted cake, and protein composition according to the present invention are prepared from a material containing the rapeseed germ as a main component. The material contains at least 38 wt %, preferably 75 wt %, more preferably 95 wt % or more for the germ. Although the germ fraction prepared according to the present invention may be used as the above material, other materials obtained by any other methods than the above separation process may be used as well.

The oil and fat according to the present invention has a lower chlorophyll content (ca.10 ppm or less) and a lower content of an eluted phosphorous component (ca. 450 ppm or less) than those contained in the rapeseed oil. Furthermore, it has a low a content of oil-soluble metals of Mg (ca.70 ppm or less) and Ca (ca.120 ppm or less). As a result, it will be easy to further purify the present oil and fat by removing the eluted phosphorous component, and the phosphorous content in a drain will advantageously low from an environmental point of view as well.

Since the oil and fat according to the present invention has a total phytosterol content of 1000 mg/100 g or more and β-sitosterol content of 500 mg/100 g or more, it is expected to show a reducing effect of cholesterol in the body.

As shown by the contents of palmitic acid of 6 wt % or more and linolenic acid of 8.5 wt % or less, the oil and fat according to the present invention has a high saturated fatty acid content and a low unsaturated acid content. As a result, it is more stable against oxidization than the conventional rapeseed oil.

The oil and fat according to the present invention are prepared from the material containing the rapeseed germ as a main component by the conventional expressing techniques.

For example, the rapeseed germ is subjected to an oil expressing machine to give the expressed oil. Before the expression, the rapeseed germ may be heated or its water content may be adjusted appropriately. Furthermore, before expression or extraction, it may be subjected to various treatments such as flaking, expression with an expander and the like, puffing, and roasting.

On the other hand, the extraction oil is obtained by extracting the expression cake with an appropriate solvent such as an organic solvent including n-hexane, water, a mixture of water and the organic solvent or critical fluid, followed by the concentration of the resulting oil. The expression oil and the extraction oil are combined to yield a rapeseed germ oil that is the oil and fat according to the present invention.

The rapeseed germ oil according to the present invention includes also the above expression oil and the extraction oil.

The solvent is removed from the cake obtained in the above expression or extraction process by any known methods to give the defatted cake according to the present invention.

The expression cake, defatted cake and protein composition that are obtained by the present invention are utilized as materials in various applications such as food, fertilizer and feed.

The present invention will be further described in more detail by referring to the following examples, which should not be construed to limit the scope of the present invention.

In the following examples, a water content, an oil content and a T-N content are determined by a heat and dry method in accordance with a standard oil analysis test (Japan Oil and Fat Chemistry Association), an ether extraction method in accordance with the same standard test, and Kjeldahl method using KJELTEC AUTO 1030 Analyzer, respectively.

EXAMPLE 1

The grains of a rapeseed were crudely crushed by using as a crushing apparatus "DEHULLING MACHINE TYPE CZ1000" manufactured by TECMACHINE CO. (in France) at a rotation rate of 2,800–3,000 rpm and a material feed rate of 700–1,000 kg/h.

The resulting hull and fine fractionicles were then removed from the thus crushed rapeseed consisting of the separated hull, germ and fine fractionicles by using as a vibrating fluidized bed (a separation taper) "FLUID BED SORTER TYPE TLF500" manufactured by TECMACHINE CO. (in France) and a light-fraction sucking apparatus.

Finally, each fraction of 16 mesh (1 mm) or less was separated with a sieve, and the composition and yield of each fraction were determined. The results are summarized in TABLE 1.

TABLE 1

| part | 16 mesh (1 mm) or less | 20 mesh (850 μm mm) or less | 24–32mesh (710–500 μm) |
|---|---|---|---|
| Germ | 38% | 76% | 95% |
| Cotyledon | 48% | 19% | 3% |
| Contaminants | 14% | 4% | 1% |
| Yield | 29% | 18% | 10% |

The yield of the germ contained in a fraction of 24–32 mesh (710–500 μm) was about 83% of a theoretical one.

The components of the germ contained in each resulting fraction of 16 mesh (1 mm) or less, 20 mesh (850 μm mm) or less, and 24–32 mesh (710–500 μm), and those of the rapeseed (control) were analyzed. The results are shown in TABLE 2.

TABLE 2

| Material | Germ Content % | Water Content % | Oil Content % | T-N Content % | T-N content in an anhydrous oil product | Extraction Oil AV |
|---|---|---|---|---|---|---|
| Rapeseed* Germ | 95 | 5.8 | 36.9 | 4.5 | 8.0 | 0.6 |
| the same as above | 76 | 5.9 | 38.2 | 4.4 | 7.9 | 0.3 |
| the same as above | 38 | 6.3 | 42.0 | 3.8 | 7.4 | 0.5 |
| Rapeseed Oil | 12 | 6.3–6.7 | 43–45 | 3.4–3.6 | 7.4–6.8 | — |

*determined by the present inventors

As seen from TABLE 2, the rapeseed germ contained in the fraction of 24–32 mesh has such a high oil content as about 37 wt % that is comparable to that in the rapeseed cotyledon (ca. 40 wt %), and it is therefore very useful as oil source.

Furthermore, because the rapeseed germ contained in the fraction of 24–32mesh has a high protein content ("T-N content"×6.25) of about 28 wt %, and a high T-N content in an anhydrous oil product (ca. 50 wt %), it is also very useful as protein source.

EXAMPLE 2

The expression oil was prepared by expressing the germ contained in each fraction of 16 mesh (1 mm) or less, 20 mesh (850 μm mm) or less, and 24–32 mesh (710–500 μm) obtained in EXAMPLE 1 with an expeller apparatus (manufactured by SUEHIRO EPM CO.). On the other hand, the extraction oil was prepared by extracting the resulting expression cake with n-hexane, followed by pooling and purification. The expression oil and the extraction oil were then combined to give the rapeseed germ oil that is the oil and fat according to the present invention.

The analytical results of the resulting rapeseed germ oil are shown in TABLE 3, in which "AV" and "POV" mean acid value and peroxide value, respectively.

TABLE 3

| Germ Content | | AV | POV (Meq/Kg) | Chlorophyll (ppm) | Phosphorous (ppm) | Ca (ppm) | Mg (ppm) | Fe (ppm) | Iodine Value |
|---|---|---|---|---|---|---|---|---|---|
| 95% | Rapeseed* Germ Oil | 0.8 | 2.4 | 2.9 | 190.0 | 18.9 | 12.4 | 1.2 | 109 |
| 76% | the same as above | 1.0 | 1.0 | 3.0 | 211.0 | 20.3 | 16.3 | 1.2 | 109 |
| 38% | the same as above | 1.3 | 0.6 | 10.1 | 451.0 | 121.1 | 70.2 | 1.8 | 111 |
| 12% | Rapeseed Oil | 2.6 | 0.4 | 12.4 | 525.0 | 203.1 | 105.1 | 3.1 | 113 |

*determined by the present inventors

The rapeseed germ oil prepared from the rapeseed germ of 24–32 mesh (710–500 μm) has a lower chlorophyll content (ca.3 ppm) and a lower content of the eluted phosphorous component (ca. 190 ppm)than those contained in the rapeseed oil. Further, it has a low content of oil-soluble metals of Mg (ca.12 ppm) and Ca (ca.19 ppm). Consequently, it will be easy to further purify the present rapeseed germ oil by removing the eluted phosphorous component, and as the phosphorous content in a drain will be low, which is preferable from an environmental point of view as well.

The chlorophyll content was determined by an absorbance method, and the contents of phosphor, magnesium and calcium were determined by ICP analysis. The fatty acid compositions of the resulting rapeseed germ oils are shown in TABLE 4.

TABLE 4

| Germ Content | Fatty acid | Palmitic Acid 16:0 | Palmitoleic Acid 16:1 | Stearic Acid 18:0 | Oleic Acid 18:1 | Linoleic Acid 18:2 | Linolenic Acid 18:3 | Arachidic Acid 20:0 | Eicosenic Acid 20:1 |
|---|---|---|---|---|---|---|---|---|---|
| 95% | Rapeseed* Germ Oil | 12.0 | 0.7 | 2.9 | 56.8 | 21.4 | 5.3 | 0.5 | 0.4 |
| 76% | the same as above | 10.1 | 0.8 | 2.0 | 57.9 | 23.3 | 5.4 | 0 | 0.5 |
| 38% | the same as above | 6.0 | 0.8 | 1.3 | 60.2 | 22.6 | 8.1 | 0 | 1.0 |
| 12% | Rapeseed Oil | 1–4 | 0–1 | 0–2 | 55–63 | 18–25 | 7–11 | 0 | 1–2 |

*determined by the present inventors

As shown by TABLE 4, since the rapeseed germ oil prepared from the rapeseed germ of 24–32 mesh (710–500 μm) contains the saturated acid (palmitic acid (16:0)) of three times or more (about 12 wt % or more) than the rapeseed, while it contains the unsaturated acid (linolenic acid (18:3)) of about half (about 5.3 wt %) of the rapeseed oil, it has an advantageous stability against oxidization.

The fatty acid contents were determined by methyl esterification-gas chromatography in accordance with the standard oil analysis test.

EXAMPLE 3

A total and each phytosterol content of the rapeseed germ oil of EXAMPLE 2 and the rapeseed oil were determined with thin-layer chromatography and gas chromatography in accordance with the standard oil analysis test. There results are summarized in TABLE 5.

TABLE 5

| | Rapeseed Germ Oil | | | Rapeseed Oil |
|---|---|---|---|---|
| Germ Content | 95% mg/100 g | 76% mg/100 g | 38% mg/100 g | 12% mg/100 g |
| Total Sterols | 2100 | 1823 | 1021 | 771 |
| Brassica | 140 | 144 | 110 | 102 |

TABLE 5-continued

| | Rapeseed Germ Oil | | | Rapeseed Oil |
|---|---|---|---|---|
| Germ Content | 95% mg/100 g | 76% mg/100 g | 38% mg/100 g | 12% mg/100 g |
| sterol | | | | |
| campesterol | 672 | 585 | 327 | 246 |
| β-sitosterol | 1190 | 1010 | 572 | 386 |
| Isofuco sterol | 95 | 84 | 49 | 37 |

The rapeseed germ oil prepared from the rapeseed germ of 24–32 mesh (710–500 μm) has the total phytosterol content of about 2,100 mg/100 g and the β-sitosterol content of 1,200 mg/100 g, that are about 2.7 times and three times as much as those of the rapeseed oil, respectively. The present rapeseed germ oil is therefore useful as a natural oil having a reducing effect of cholesterol in the body.

EXAMPLE 4

The defatted rapeseed germ (100 g) obtained during the expression process of EXAMPLE 2 was mixed with 1 L of water and extracted with stirring for 30 min at 50° C. After removal of insoluble materials by centrifugation, the extract solution was adjusted to pH 4.5 so as to precipitate protein. The resulting precipitate was centrifuged and suspended into water, which was then adjusted to pH 7 in order to dissolve the precipitate. The resulting solution was then spray dried or lyophilized to give 35 g of protein derived from the rapeseed germ.

What is claimed is:

1. Oil and fat prepared by extraction or expression or a combination thereof from a material containing the rapeseed germ in an amount of at least 38 wt %.

2. The oil and fat of claim 1, wherein the amount is at least 75 wt %.

3. The oil and fat of claim 2, wherein the amount is at least 95 wt %.

4. The oil and fat of claim 1, wherein the material is a germ fraction which is produced by crushing a rapeseed and separating said fraction.

5. The oil and fat of claim 2, wherein the material is a germ fraction which is produced by crushing a rapeseed and separating said fraction.

6. The oil and fact of claim 3, wherein the material is a germ fraction which is produced by crushing a rapeseed and separating said fraction.

7. The oil and fat of claim 4, wherein the separation is carried out by sorting with air or by using a sieve.

8. The oil and fat of claim 5, wherein the separation is carried out by sorting with air or by using a sieve.

9. The oil and fat of claim 6, wherein the separation is carried out by sorting with air or by using a sieve.

* * * * *